US010086276B2

(12) United States Patent
Lowe et al.

(10) Patent No.: US 10,086,276 B2
(45) Date of Patent: Oct. 2, 2018

(54) SYSTEMS AND METHODS FOR PROCEDURAL GAME CONTENT GENERATION VIA INTERACTIVE NON-PLAYER GAME ENTITIES

(71) Applicant: Disney Enterprises, Inc., Burbank, CA (US)

(72) Inventors: Robert Lowe, Layton, UT (US); Joseph Olson, Burbank, CA (US); David White, Burbank, CA (US); Troy Johnson, Burbank, CA (US); Jared Schibel, Burbank, CA (US); Jason Scanlon, Clearfield, UT (US); Chad Liddell, Taylorsville, UT (US); Christopher Shen, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 466 days.

(21) Appl. No.: 14/958,708

(22) Filed: Dec. 3, 2015

(65) Prior Publication Data

US 2017/0157510 A1    Jun. 8, 2017

(51) Int. Cl.
A63F 13/30 (2014.01)
A63F 13/69 (2014.01)
A63F 13/825 (2014.01)

(52) U.S. Cl.
CPC .............. *A63F 13/30* (2014.09); *A63F 13/69* (2014.09); *A63F 13/825* (2014.09)

(58) Field of Classification Search
None
See application file for complete search history.

(56) References Cited

U.S. PATENT DOCUMENTS 6,477,580 B1    11/2002    Bowman-Amuah
2003/0130021 A1    7/2003    Lydon
(Continued)

FOREIGN PATENT DOCUMENTS

| EP | 1333376 | 8/2003 |
| WO | 102855209 | 1/2013 |
| WO | 2013086663 A1 | 6/2013 |

OTHER PUBLICATIONS

Razia Sultana, Andreas Christ, Patrick Meyrueis, "Diversity of devices along with diversity of data formats as a new challenge in global teaching and learning system," Proc. SPIE 9289, 12th Education and Training in Optics and Photonics Conference, 92891V (Jul. 17, 2014); doi: 10.1117/12.2070563 Event: 12th Education and Training in Optics and Photonics Conference, 2013, Porto, Portugal, 7 pages.

(Continued)

*Primary Examiner* — Robert T Clarke, Jr.
(74) *Attorney, Agent, or Firm* — Sheppard Mullin Richter & Hampton LLP

(57) ABSTRACT

Systems and methods for providing content in a virtual space are presented herein. The content may be generated in the virtual space by a non-player game entity. The non-player game entity may be associated with generating a particular type of content in the virtual space. The users may deploy the non-player game entities in the virtual space in order to generate the corresponding non-player game entity-generated content in the virtual space. The non-player game entity-generated content may be implemented through procedural placement of elements of the content within the virtual space. The non-player game entity-generated content comprise one or more of static content, moving content, interactive content (e.g., a game), and/or other types of content.

16 Claims, 3 Drawing Sheets

(56) References Cited

U.S. PATENT DOCUMENTS

| | | | |
|---|---|---|---|
| 2006/0148545 A1* | 7/2006 | Rhyne, IV | A63F 13/00 |
| | | | 463/1 |
| 2010/0017728 A1 | 1/2010 | Cho | |
| 2011/0131226 A1 | 6/2011 | Chandra | |
| 2011/0307304 A1 | 12/2011 | Mercuri | |
| 2012/0122587 A1 | 5/2012 | Kelly | |
| 2012/0260195 A1 | 10/2012 | Hon | |
| 2012/0309511 A1 | 12/2012 | Chung | |
| 2013/0132477 A1 | 5/2013 | Bosworth | |
| 2013/0346453 A1 | 12/2013 | Procopio | |
| 2014/0162781 A1* | 6/2014 | Butler | A63F 13/795 |
| | | | 463/31 |
| 2014/0315639 A1 | 10/2014 | Cao | |
| 2015/0052458 A1 | 2/2015 | Rothenberger | |
| 2016/0250558 A1* | 9/2016 | Fujisawa | A63F 13/10 |
| | | | 463/31 |
| 2016/0279522 A1* | 9/2016 | de Plater | A63F 13/67 |
| 2016/0332081 A1* | 11/2016 | Marr | A63F 13/63 |
| 2017/0120150 A1* | 5/2017 | Berger | A63F 13/55 |

OTHER PUBLICATIONS

Anonymous, Mobile Web Best Practices 1.0—Jun. 27, 2006 (Jun. 27, 2006); pp. 1-35.

* cited by examiner

SYSTEMS AND METHODS FOR PROCEDURAL GAME CONTENT GENERATION VIA INTERACTIVE NON-PLAYER GAME ENTITIES

FIELD OF THE DISCLOSURE

This disclosure relates to procedural game content generation in a virtual space via interactive non-player game entities.

BACKGROUND

Video games may take place in a virtual space. In some implementations, a video game may be an online game. The virtual space may be hosted by a server over a network, such as the internet, to client computing platforms associated with users of the virtual space. In some implementations, a virtual space may be hosted locally at the client computing platforms. For example, a client computing platform may be a gaming console (e.g., XBOX, PLAYSTATION, etc.). The virtual space may be provided to users through local hosting at the client computing platform (e.g., via a game disc, cartridge, memory card, etc.). These types of games may be referred to as console games. In some implementations, console games may represent an offline version of an online game.

In some implementations of a virtual space, users may create and/or generate content. Users may use one or more virtual "building blocks" to create virtual objects (e.g., buildings, cities, and/or other objects), entire virtual worlds, games, and/or other user generated content.

SUMMARY

One or more aspects of the disclosure relate to a system configured for generating content within a virtual space using non-player game entities. A non-player game entity may be an artificial intelligence (AI) controlled virtual object, and/or other non-player game entities. One or more non-player game entities may follow predetermined instructions that may facilitate controlling the non-player game entities in the virtual space to generate corresponding non-player game entity-generated content. The non-player game entity-generated content may include interactive content, such as a game and/or other content. Users may deploy one or more non-player game entities in the virtual space to initiate generation of content. Users may interact with the non-player game entities to modify or change the non-player game entity-generated content. Users may participate in and/or otherwise interact with the non-player game entity-generated content.

The system may include one or more physical processors configured by machine-readable instructions to execute one or more computer program components. The computer program components may include one or more of a space component, a control component, and/or other components.

The space component may be configured to execute an instance of a virtual space. The space component may be configured to implement the instance of the virtual space to facilitate user participation in the virtual space. User participation may include providing entry and/or selection of virtual space content. The entry and/or selection of virtual space content may generate, provide, and/or otherwise correspond with requests to define user-generated content within an instance of the virtual space. In some implementations, instances of the virtual space may be hosted by a server to computing platforms associated with the users. In some implementations, instances of the virtual space may be hosted locally at the computing platforms.

The control component may be configured to control non-player game entities in the virtual space to generate virtual space content. The corresponding non-player game entity-generated content may include interactive content. The interactive content may facilitate gameplay within the virtual space by one or more users. In some implementations, interactive content may correspond to content that may include one or more of virtual objects, causal and effected behaviors of the one or more virtual objects, criteria specifying a relationship between the causal behaviors and the effected behaviors of the one or more virtual objects, and/or other content. In some implementations, generating content may include effectuating procedural placement of the one or more virtual objects in the virtual space. A non-player game entities may be depicted as "building" corresponding non-player game entity-generated content within an instance of the virtual space.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
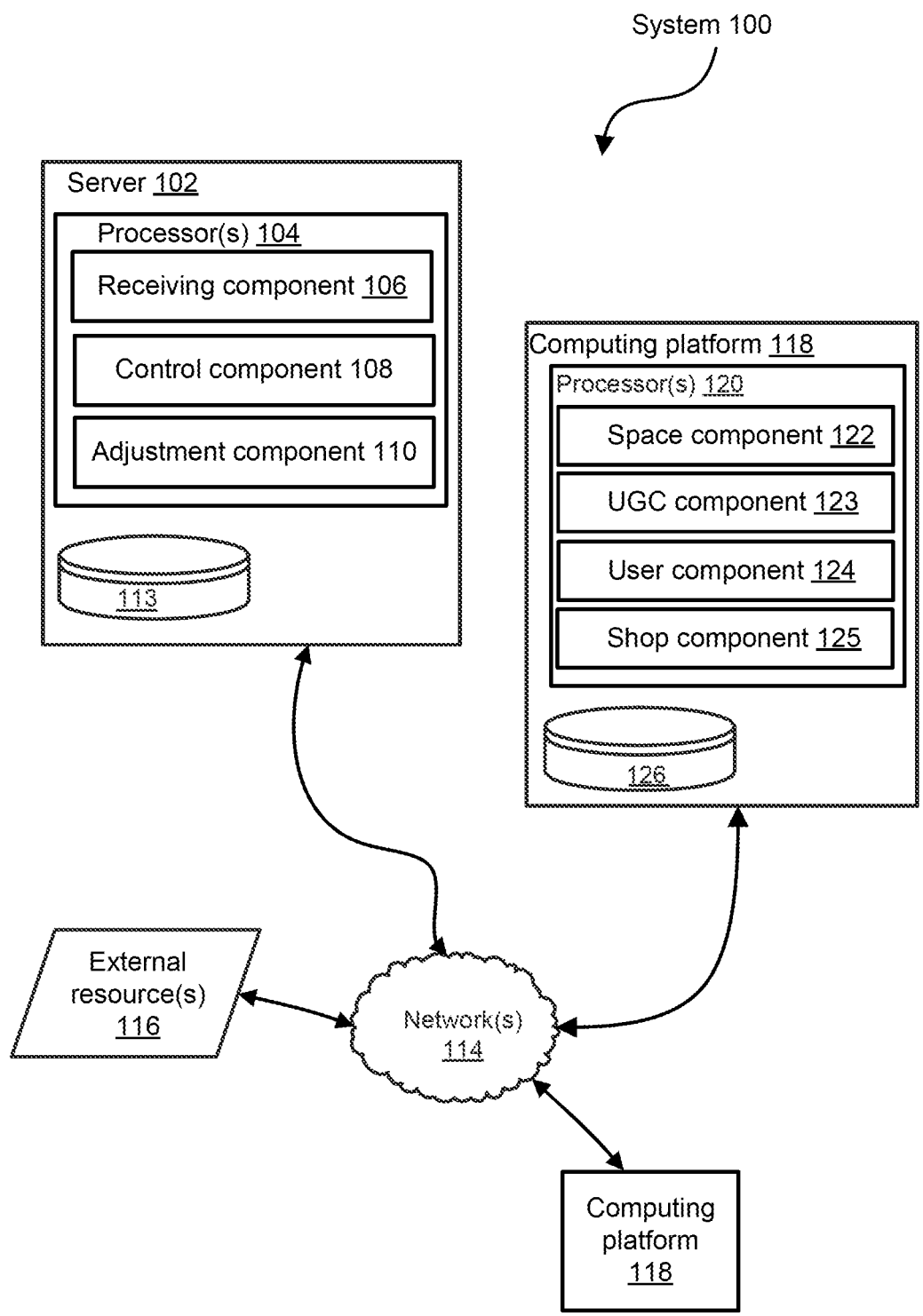
FIG. 1 illustrates an implementation of a system for providing content in a virtual space.

FIG. 1 illustrates a system 100 for providing content in a virtual space, in accordance with one or more implementations. In particular, content may be provided within the virtual space through non-player game entities that create and/or otherwise generate within the virtual space. The content may then be experienced by one or more users within the virtual space. The non-player game entities may create the content through procedural placement of elements of the content, in accordance with one or more implementations. The content created by the non-player game entities may be static content, moving content, interactive content (e.g., a game), and/or other content.

In some implementations, the virtual space may be hosted locally on computing platforms 118 associated with users of the virtual space. In some implementations, the virtual space may be hosted by a server (e.g., server 102) over a network 114, such as the Internet and/or other networks. The virtual space may be accessed by users via the computing platforms 118. In some implementations, the virtual space may include one or more games taking place within the virtual space, and/or other content.

In some implementations, the term "content" may refer collectively to virtual objects, game entities, games, gameplay mechanics, logical relationships that may be established between virtual objects, and/or other content. A game entity may refer to a virtual object (or group of objects) present in the virtual space that represents an individual user and/or is controlled by the user. A game entity may be a virtual character (e.g., an avatar) and/or other virtual object. A group of game entities may include a group of virtual characters, virtual objects, and/or other groups. In some implementations, a group of game entities may comprise a troop, a battalion, a clan, and/or other groups.

In some implementations, the virtual space may include non-player game entities. A non-player game entity may be an artificial intelligence (AI) controlled virtual object (and/or group of virtual objects) present within the virtual space. The non-player game entities may follow predetermined instructions, may react in real time to content in the virtual space (e.g., user-generated content, other non-player game entities, and/or other content), may interact with users within the virtual space, and/or may perform one or more other functions. In some implementations, non-player game entities may also be referred to as non-player characters. In general, a non-player game entity may be a virtual object that may not be representative of a user.

One or more virtual objects included in the virtual space may include virtual items and/or virtual goods that may be usable within the virtual space and/or a game that takes place in the virtual space. Virtual items and/or goods may include one or more of a virtual weapon, a tool, a food, a currency, a reward, a bonus, health, a potion, an enhancement, a mount, a power-up, a speed-up, virtual clothing (e.g., shirt, hat, pants, etc.), a vehicle, an anatomical feature of a character and/or game entity, a troop or troop type, a pet, a virtual resource, a structure element, a modular element, a building block, and/or virtual items and/or goods.

The computing platforms 118 may include, for example, a cellular telephone, a smartphone, a laptop, a tablet computer, a desktop computer, a television set-top box, a smart TV, a gaming console, a client device, and/or other device suitable for the intended purpose(s) presented herein.

In FIG. 1, in some implementations, providing the virtual space may include hosting the virtual space on the computing platforms 118. In some implementations, a given computing platform 118 may be a gaming console and/or other computing platform. The computing platforms 118 may be configured to execute an instance of the virtual space and/or game taking place in the virtual space by using information stored by and/or local to the computing platforms 118 (e.g., a game cartridge, game disk, memory card/stick, USB memory stick, electronic storage, and/or other information storage) and/or other information. In some implementations, the computing platforms 118 may be configured to execute an instance of the virtual space and/or game taking place in the virtual space using information received from server 102.

The computing platforms 118 may individually include one or more processors 120, electronic storage 126, and/or other components. The one or more processors 12 may be configured to execute one or more computer components for implementing the instance of the virtual space and/or a game taking place within the virtual space and to facilitate the participation of associated user(s) in the virtual space. The computer program components of the computing platforms 118 may include one or more of a space component 122, a user-generated content component 123, a user component 124, a shop component 125, and/or other components. In some implementations, the computing platforms 118 may be configured to communicate with server 102 and/or other entities participating in system 100 over network(s) 114.

In some implementations, some or all of the functionality of the computing platforms 118 may be attributed to server 102, and/or vice-versa. In some implementations, providing the virtual space may include hosting the virtual space over the network(s) 114. The server 102 may include one or more of one or more processors 104, electronic storage 113, and/or other components. The one or more processors 103 may be configured by machine-readable instructions to execute the one or more computer components. Processors 104 may include the same or similar components as presented for the computing platforms 118, and/or other components. The users may access server 102 and/or the virtual space via individual computing platforms 118 associated with the users.

In some implementations, the server 102 may be configured to determine state of the virtual space. The state may then be communicated (e.g., via streaming visual data, via object/position data, and/or other state information) from server 102 to the computing platforms 118 for presentation to the associated user(s) via client/server architecture, and/or other communication architecture. In some implementations, server 102 may be attributed with more or less functionality described herein for the computing platforms 118 in order for server 102 to execute an instance of the virtual space.

Referring back to the computing platforms 118, the space component 122 may be configured to execute an instance of the virtual space, and implement the instance of the virtual space on the corresponding computing platform 118. The instance of the virtual space may be executed by one or more components to determine the state of the virtual space. The state determined and presented by a given computing platform 118 may correspond to a location in the virtual space (e.g., location in a game). The view described by the state may correspond, for example, to the location from which the view is taken, the location the view depicts, and/or other locations, a zoom ratio, a dimensionality of objects, a point-of-view and/or view parameters of the view. One or more of the view parameters may be selectable by the users.

An instance of the virtual space may comprise a simulated space that is accessible by the users via a client (e.g., computing platform 118 and/or other computing platforms) that presents the views of the virtual space to the users. The simulated space may have a topography, expressing ongoing real-time interaction by one or more users, and/or including one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of gravity-deprived space with one or more celestial bodies positioned therein). An instance executed by the computer components may be synchronous, asynchronous and/or semi-synchronous.

The above description of the manner in which state of the virtual space is determined by space component 122 is not intended to be limiting. The space component 122 may be configured to express the virtual space in a more limited or richer manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 122, users may control game entities, groups of game entities, simulated physical phenomena (e.g., wind, rain, earthquakes, and/or other phenomena), and/or other elements within the virtual space to interact with the virtual space and/or other users. Individual game entities may include virtual characters, such as avatars, and/or other virtual objects. A given game entity and/or group of game entities may be controlled by a user with which it is associated. The users may control a group of game entities through control of a group entity that is associated with the group. The user controlled element(s) may move through and interact with the virtual space (e.g., non-user characters in the virtual space, other objects in the virtual space). The user controlled elements controlled by and/or associated with a user may be created and/or customized by the user, based on information received by the given computing platform 118 (e.g., from server 102), and/or may be based on other information. The users may have an "inventory" of virtual items, game entities, non-player game entities and/or currency that the user can use (e.g., by manipulation of a virtual character or other user controlled element and/or other items) within the virtual space.

The users may participate in the instance of the virtual space by controlling one or more of the available user controlled game entities in the virtual space. Control may be exercised through control inputs such as entry, selection and/or commands input by the users through a given computing platform 118 and/or other computing platforms. Users may interact through communications exchanged within the virtual space. Such communications may include one or more of textual chat, instant messages, private messages, voice communications and/or other communications. Communications may be received and entered by the users via their respective computing platforms. Communications may be routed to and from the appropriate users through network(s) 114 and/or through communications which are external to the system 100 (e.g., text messaging services associated with the users).

In some implementations, the users may participate in an instance of the virtual space by creating user-generated content. Creation of user-generated content may be facilitated through entry and/or selection of virtual space content via a computing platform 118. The entry and/or selection may generate requests to define the virtual space content (e.g., user-generated content) within the virtual space (see, e.g., user-generated content component 123). For example, the users may provide entry and/or selection of virtual space content corresponding to requests to define customized virtual spaces, and/or portion(s) of a virtual space. The user-generated content may include, for example, a game, a scene, an environment, one or more virtual objects, and/or other content.

In some implementations, an instance of the virtual space may be persistent. That is, the virtual space may continue on whether or not individual players are currently logged in and/or participating in the virtual space. A user that logs out of the virtual space and then logs back in some time later may find the virtual space has been changed through the interactions of other players with the virtual space during the time the player was logged out. These changes may include changes to the simulated physical space, changes in the user's inventory, changes in other user's inventories, changes experienced by non-player characters, changes to the virtual items available for use in the virtual space and/or other changes.

In FIG. 1, the user-generated content component 123 may be configured to receive entry and/or selection from the users of virtual space content. The entry and/or selection of virtual space content may generate requests to define corresponding user-generated content within the virtual space. Entry and/or selection may be facilitated through one or more input mechanisms included and/or coupled to the computing platforms 118. In some implementations, entry and/or selection from the user may be facilitated via a user interface effectuated by the user-generated content component 123. For example, user-generated content component 123 may be configured to effectuate presentation of a user interface depicting a "blank" virtual space and/or portion of a virtual space, wherein the virtual space and/or portion thereof may include no, or a limited amount of virtual objects and/or other content. Users may make selections of content and/or generate requests to customize the virtual space. User selections and/or entry of content to generate the requests for defining content may be facilitated in a variety of ways. For example, the displayed user interface may include drop down windows, drag-and-drop icons, check boxes, and/or other display elements which represent virtual objects and/or other virtual content which may be available to be arranged within the virtual space by the user. The users may be able to provide entry and/or selection of content into the computing platform 118 corresponding to requests for selection, placement, orientation, and/or arrangement of one or more virtual objects within the virtual space.

In some implementations, the user-generated content component 123 may be configured to provide virtual space templates. Virtual space templates may correspond to instances of the virtual space which include some, or few, virtual objects and/or other content arranged in predetermined positions, and/or other predetermined content. The user-generated content component 123 may be configured to allow users to further customize the virtual space templates to create custom virtual spaces (e.g., user-generated content).

In some implementations, user-generated content may be associated with virtual objects and/or other content which may be arranged and/or displayed within views of the virtual space in accordance with entry and/or selection by the users requesting such arrangement and/or display. Virtual objects may include one or more of structural building elements (e.g., a brick, a stone, a pillar, and/or other elements), combinations of virtual objects that are arranged together to define a larger scale virtual object (e.g., a virtual building made up of virtual building blocks, and/or other objects), vehicles, characters, and/or other elements and/or topographical elements which may be capable of interaction with the users of the virtual space. Users may arrange the virtual objects in manner to depict a virtual environment, a scene, a game, a game space, a location, and/or other content. A virtual environment may be, for example, a virtual world, a city, a village, a race track, a maze, an obstacle course, a house, a store, and/or other environments. A virtual environment may include buildings which the users can enter while interacting in the virtual space. A virtual environment may include other virtual objects and/or other content.

In some implementations, a user-generated virtual object may comprise a combination, collection, and/or arrangement of elemental virtual objects (e.g., a structural element, a building block, and/or other objects). For example, a virtual object such as a building may comprise a plurality of elemental virtual objects such as bricks (and/or other elemental virtual objects) that may be arranged and/or placed in a manner to "create" the building. Herein, it is noted that the term "element", "modular element", "modular component", "modular virtual object", and/or "elemental virtual object" may refer to virtual objects that may be used to create and/or build larger-scale virtual objects in some organized fashion (e.g., a brick may be considered an elemental virtual object, while a building made of brinks may not be considered an elemental virtual object). Herein, the terms "combination of virtual objects", "structured arrangement", and/or "large-scale virtual object" may refer to the virtual object that is comprised of the multiple element virtual objects. Information received by the receiving component 106 may include, for example, the type of the combination of virtual objects (e.g., a building, a track, a road, and/or other virtual objects), quantities of different types of combinations of virtual objects, types of elemental virtual objects that make up the combination of virtual objects, quantities of the elemental virtual objects, positioning within the virtual space, properties of the combination of virtual objects, properties of the elemental virtual objects, and/or other information.

In some implementations, user-generated content may be associated with logical relationships established between the one or more virtual objects included in the user-generated content, and/or other information. One or more of the logical relationships may correspond to "cause-and-effect" relationships that may be established between two or more virtual objects, and/or other relationships. A cause-and-effect relationship may specify a virtual object as a causal object, a causal behavior for the causal object, a virtual object as an effected object, an effected behavior of the effected object, and/or other aspects of the cause and effect relationship. In some implementations, the effected behavior and/or causal behavior may comprise actions that are performed on or by the respective object. A logical relationship may be established by specifying, for example, that detected occurrences of the causal behavior of the causal object may result in the effected object performing the effected behavior.

As used herein, the term "action" may refer to something performed by, to, or on a virtual object within the virtual space. An action may be reflected in a change between states, an event, and/or other phenomena. An action may be active (e.g., performed by the virtual object), passive (e.g., performed on the virtual object), and/or some combination of active and passive. Action criteria may specify a causal object, a causal behavior, an effected object, an effected behavior, and/or other aspects of the cause and effect relationship. A relationship may specify that "if the first casual behavior is satisfied for the first causal object", then "effectuate the first effected behavior in the first effected object."

By way of non-limiting example, a given virtual object may be a virtual button. Another given virtual object may be a virtual cannon. A relationship may establish the virtual button as the causal object, and the virtual cannon as the effected object. A relationship establishing that "if the virtual button is pressed, then fire confetti out of the virtual cannon" may specify the virtual button being pressed as the causal behavior, may specify the virtual cannon firing confetti as the effected behavior, and/or may establish other aspects of the logical relationship. In some implementations, the logical relationships may be effectuated by implementing programming rules within the virtual space that establish these relationships. Logical relationships may be considered in other ways. It is noted that the above description of a virtual button and virtual cannon is provided for illustrative purposes only and not to be considered limiting. For example, in some implementations, causal object, causal behaviors, effected objects, and/or effected behaviors may be considered in other way.

In some implementations, these "cause and effect" relationships may provide a mechanism in which games may be created, changed, and/or otherwise provided to the users of the virtual space. Such relationships may provide a technique in which game rules may be implemented within the virtual space, such that game objectives may possible.

In some implementations, user-generated content may be associated with one or more games which may be created and/or selected by a user. Games may include online games, multi-player games, mini games, bonus games, solo games, campaign games, skills games, games of chance, and/or other games. The games may comprise a simulated environment. The simulated environment may have a topography, express ongoing real-time interaction by one or more users, and/or may include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the environment. In some instances, the topography may describe a volume with one or more bodies positioned therein (e.g., a simulation of gravity-deprived environment with one or more celestial bodies positioned therein.

In some implementations, user-generated content may be associated with game objects, game logic, and/or other content selected and/or entered by a user. Game objects may correspond to the arrangement and/or positioning of virtual objects within the simulated environment that define a game space. By way of non-limiting example, a game may be a racing game, and game objects may comprise portions of a road which define a race track. The discussion of "racing" above is not intended to limit the type of content which may be provided in the virtual space to define a game space. Instead, this is simply an example and is not limiting with respect to content type, game type, and characteristics associated with a user-generated game. Arrangement of virtual objects within the virtual space may be considered in other ways.

Game logic may correspond to aspects of user interaction in the virtual space. Game logic may correspond to logical relationships which may be established between two or more of the game objects present in the virtual space, as presented herein. Game logic may correspond to one or more game objectives and/or rules associated with a game, and/or other logic associated with user interaction within the virtual space. Rules may describe and/or restrict the manner in which gameplay may commence while interacting with the game to achieve an objective. Game rule rules may describe a minimum and/or maximum number of players, gameplay duration, levels of a game, bounds of a game space, factors for winning the game, factors for losing the game, and/or other information. By way of non-limiting illustration, following the above racing game example, game logic may include a definition of where a lap starts and/or ends on a race track, the amount of laps needed to be completed to win a race, the number of players who can race on the track at a given time, and/or other rules associated with gameplay. Game logic may be considered in other ways.

In some implementations, the user-generated content may include metadata associated with the content. The user-generated content component 123 may be configured to receive entry and/or selection of information from the user related to metadata associated with the user-generated content. Metadata may include information such as a name given to the content by the user (e.g., "Bob's Raceway"), a description about the content (e.g., "A ten lap race consisting of 3 hairpin turns!"), an image depicting a view of the content (e.g., a screenshot depicting the starting line of a simulated race track), and/or other information associated with the user-generated content.

In FIG. 1, the user component 124 may be configured to access and/or manage one or more user profiles, user information, and/or user accounts associated with the users. The one or more user profiles and/or user information may include information stored locally to a given computing platform 118, by server 102, one or more other computing platforms, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), control input information (e.g., a history of control inputs provided by the user), user-generated content history information, user-generated content sharing history information, virtual inventory information (e.g., virtual inventories associated with the users that include one or more virtual items available for the users in the virtual space and/or game entities available to the user for use in a group of game entities in the virtual space), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a computing platform identification associated with a user, a phone number associated with a user and/or other information related to users.

In FIG. 1, the shop component 125 may be configured to present offers to sell instances of virtual objects to users in a virtual shop. The virtual shop may be a simulated environment within the virtual space which is accessible by users and presents the views of the virtual shop to the users. Users may access the virtual shop through one of a variety of ways. Users may access the virtual shop through the manipulation of one or more game entities associated with the users within the virtual space using control inputs and/or commands inputted by the users through computing platforms 118 and/or other way of access.

Manipulation of a game entity, such as a character or avatar, may include moving the one or more entities through the virtual space using control inputs and/or commands inputted by the users through computing platforms 118, to move the one or more entities to the simulated environment designating the location of the virtual shop within the virtual space.

Users may use control inputs and/or commands not associated with the one or more entities to access the virtual shop. Control inputs and/or commands may automatically present the instance of the virtual shop on the computing platforms 118 (e.g., user selects a virtual shop button to automatically be taken to the virtual shop).

The instance of the virtual shop may be presented to users through a shop interface. The shop interface may be configured to present the offers to sell virtual items to users. The shop interface may be configured to receive entry and/or selection of individual offers by the users to effectuate acceptance and/or purchase of the offers at a virtual (or real) currency purchase price.

The simulated environment of the virtual shop may have topography. The virtual shop may express ongoing real-time interaction by one or more users (e.g., may have limited stock of virtual items for sale which can be purchased by one or more users within the virtual space which can be depleted), and/or include one or more objects (e.g., one or more virtual items, a virtual teller and/or other objects) positioned within the topography that may be capable of locomotion within the topography. The virtual shop may display the virtual items and/or the one or more sets of virtual content available for purchase by the users. Users may view the virtual items (e.g., individual virtual items and/or sets of virtual items) available for purchase. Users may purchase the virtual items using virtual (or real) currency. Transactions may take place with the virtual teller through various other actions of the user within the instance of the virtual shop and/or other offer/transaction mechanisms.

In some implementations, the shop component 125 may be configured to present offers to sell instances of non-player game entities that may be configured to create and/or otherwise generate content within the virtual space. In some implementations, the non-player game entities may be associated with particular content generation. For example, a given non-player game entity may be associated with a given type of content such as one or more of a house (e.g., a tree house, a cottage, a mansion, a townhome and/or other content), a road, a shop (e.g., a bakery, a retail shop and/or other content), a game (e.g., a race game, an obstacle course, a mini-game, a single-player game, a multiplayer game and/or other content), a landscape, a garden, a vehicle (e.g., a car, a boat, an airplane, a bicycle and/or other content), static content, moving content, interactive content and/or other content. The non-player game entities may be stored in user inventories in the same or similar manner as other inventory items. In some implementations, non-player game entities may be acquired by the users in other ways. For example, in addition and/or alternative to purchase of non-player game entities via the virtual shop, users may acquire non-player game entities through gameplay, from other users (e.g., gifting), by chance, and/or other techniques.

In FIG. 1, the sever 102 may include electronic storage 113, one or more of processors 104, and/or other components. One or more processors 104 may be configured by machine-readable instructions to execute one or more computer program components. The computer program components may include one or more of a receiving component 106, a control component 108, an adjustment component 110 and/or other components. It is noted that in some implementations, the components included in processors 104 of the server 102 may instead be implemented in the computing platforms 118. As such, it is to be understood that in other implementations, the features and/or functionally described for server 102 herein may be attributed to the computing platforms 118 and/or other entities.

With that being said, referring back to server 102, in some implementations, the receiving component 106 may be configured to obtain information associated with one or more non-player game entities associated with the users, and/or other information. The obtained information may include information related to controlling the non-player game entities in the virtual space to configure corresponding non-player game entity generated content in the virtual space, and/or other information. In some implementations, the received information may include non-player game entity identification, instructions for controlling the non-player game entity, information used to look up instructions for controlling the non-player game entity, user information, and/or other information. In some implementations, the corresponding non-player game entity generated content may be configured in the virtual space based on controlling non-player game entities.

The receiving component 106 may obtain information in a variety of ways. In some implementations, the receiving component 106 may obtain information from the computing platforms 118, may obtain the information from electronic storage 113 that may be local to the server 102, may obtain the information from an external resource 116, and/or other entities.

In some implementations, the receiving component 106 may obtain the information from the computing platforms 118. The computing platforms 118 may store instructions for controlling a non-player game entity, an identifier of the non-player game entity, and/or other information associated with the non-player game entity. For example, when a user acquires a non-player game entity, the non-player game entity and/or an instance of the non-player game entity may be included in their inventory. An identifier of the non-player game entity, the corresponding instructions for controlling the non-player game entity, and/or other information may be included in the users inventory at the computing platform 118 of the user.

In response to user entry and/or selection to "deploy" and/or otherwise use a non-player game entity from their inventory, the computing platform 118 may communicate information associated with the non-player game entity to the sever 102 (e.g., receiving component 106). The information that may be communicated to the server 102 may include one or more of the instructions for controlling the non-player game entity, the identifier of the non-player game entity, user information, and/or other information.

In some implementations, an identifier may comprise information specifically identifying a non-player game entity, a description of the corresponding non-player game entity-generated content, and/or other information. In some implementations, an identifier, and/or other identifying information, may specify and/or may be used to determine the instructions for controlling the non-player game entity, and/or may specify other information. An identifier and/or identifying information may include one or more of a serial number, a code, a name, a description, a key and/or other information.

In some implementations, the receiving component 106 may obtain the instructions for controlling the non-player game entity by correlating the identifier and/or identifying information with pre-stored information and/or instructions that may be associated with the identifying information. By way of a non-limiting example, the server 102 may have access to a database, a list, a look up table, and/or specifications that associate identifying information of a non-player game entity with instructions for controlling the non-player game entity. Such a database, list, look up table, and/or other specifications may be stored, for example, in electronic storage 113 and/or other location.

In some implementations, the instructions for controlling a non-player game entity may include a description of the corresponding non-player game entity generated content. The description may include information such as one or more virtual objects associated with the content, quantities of individual ones of the one or more virtual objects, attribute values of attributes of one or more virtual objects (e.g., properties, strength, power, textures, colors, shapes and/or other attributes), placement and/or positioning of the one or more virtual objects, procedural order(s) for placing the one or more virtual objects in the virtual space, information indicating actions and/or effects for individual ones of the one or more virtual objects (e.g., logical relationships associated with the one or more virtual objects, action criteria and/or other information), the time required to build the corresponding content, and/or other information.

In some implementations, instructions for controlling a non-player game entity may include instruction for procedural placement of elemental virtual objects within the virtual space, movement of the non-player game entity in the virtual space, and/or other instructions. In some implementations, during deployment of a non-player game entity within the virtual space, the non-player game entity may be depicted to maneuver through the virtual space such that the non-player game entity appears to build the virtual objects. In some implementations, the non-player game entities may appear to build the corresponding non-player game entity-generated content "from the ground up" using the element virtual objects (e.g., "brick by brick") and/or by other techniques.

In some implementations, procedural placement may correspond to a location where an elemental virtual object may be placed and/or otherwise positioned within the virtual space, and/or other information. In some implementations, procedural placement may correspond to a spatial relationship between element virtual objects, and/or other information. Spatial relationships may include relationships such as "on top of", "on the right side", "on the left side", "at a first location", "at a second location", given coordinates within a coordinate system, and/or other relational information.

In some implementations, procedural placement may correspond to a time period between placement of an elemental virtual object and a subsequent elemental virtual object, and/or other information. In some implementations, procedural placement may correspond to a total time period for placing all elemental virtual objects associated with non-player game entity generated content within the virtual space, and/or other information.

In some implementations, procedural placement may correspond to a required and/or recommended "footprint", or area, within the virtual space that may be needed to generate a virtual object from a plurality of elemental virtual objects in the virtual space and/or other information. In some implementations, procedural placement may be dynamic (e.g., adjustable, modifiable and/or changeable by the user and/or non-player game entities). In some implementations, procedural placement may not be modifiable.

In some implementations, procedural placement may correspond to a random placement of elemental virtual objects in the virtual space. In some implementations, the random placement of elemental virtual objects may be constrained by one or more rules. For example, rules may constrain the "random" placement of the elemental virtual objects such that, although individually the elemental virtual objects may appear to be placed randomly, in the end a cohesive virtual object may be created by virtue of the arrangement of elemental virtual objects. The "randomness" may therefore ensure that unique constructs may be generated every time a non-player game entity is deployed in the virtual space.

By way of non-limiting example, a first instance of procedural placement of elemental virtual objects may generate a first virtual object having a first shape. A second instance of procedural placement of elemental virtual objects may generate the first virtual object having a second shape. The first shape may be different than the second shape.

By way of non-limiting example, a "Tree House Builder" type of non-player game entity may be configured to generate tree houses in the virtual space through placement of elemental virtual objects that define tree houses. The procedural placement of the elemental virtual objects may be "randomized" such that a different style, version, type, theme, shape and/or configuration of a tree house may be generated for different instances the non-player game entity is deployed. By way of a non-limiting example, this may include a 2-story tree house being generated at a first instance and a 3-story tree house being generated at a second instance.

In some implementations, rules may be defined by an association graph, lookup table and/or other specifications. The association graph (or other technique) may define spatial relationships and/or threshold spatial relationships between one or more elemental virtual objects, the elemental virtual object quantities associated with a construct, different attributes for the element virtual objects used for a construct and/or other information. The association graph may provide a technique in which different logical placement(s), quantities and/or configurations of element virtual objects may be carried out in the virtual space such that different and/or varying desired constructs may be generated, and/or other operations may take place. As an illustrative example, an association graph may define different spatial relationships of elemental virtual objects and/or quantities of the elemental virtual objects used in to build some arrangement (e.g., a tree house) such that in a first instance of a non-player game entity, a first version of the arrangement may be provided (e.g., a two-story tree house), and in a second instance of the non-player game entity, a second version of the arrangement may be provided (e.g., a three store-tree house).

The discussion of the "tree house" above is not intended to limit the type of content which may be generated as different versions within the first instance and the second instance of the virtual space. Instead, this is simply an example, and is not limiting with respect to content type, theme and/or other characteristics.

In some implementations, association graphs and/or other specifications may be stored locally at the server 102, computing platforms 118 and/or other locations. In some implementations, an association graph may be included in the information associated with the non-player game entity obtained by receiving component 106. It is noted that the above example is provided merely for illustrative purposes and is not to be considered limiting. Association graphs may be considered in other ways.

In some implementations, the non-player game entity generated content associated with a non-player game entity may be related to one or more themes. Themes may correspond to one or more of color, shape, size, branding, location within the virtual space and/or other information. In some implementations, a non-player game entity may be associated with building content that is consistently of the same or similar theme. For example, a theme may be carried out in generation of the non-player game entity generated content when the non-player game entity is deployed. That is, a first theme may be determined and/or associated with a first non-player game entity. The first non-player game entity may be associated with a first type of non-player game entity generated content. A first instance of the first non-player game entity may generate a first version of the first type of non-player game entity generated content within the virtual space. The first version may relate to the first theme. A second instance of the first non-player game entity generated content may generate a second version of the first type of the non-player game entity generated content. The second version may also be related to the first theme. Thematic relationships may be considered in other ways.

In some implementations, a group of non-player game entities may be associated with a same or similar theme. A first theme may be associated with one or more of a first non-player game entity, a second non-player game entity, and/or other non-player game entities. The first non-player game entity may be associated with a first type of non-player game entity generated content. The second non-player game entity may be associated with a second type of non-player game entity-generated content. A first instance of the first non-player game entity may generate a first version of the first type of non-player game entity generated content within the virtual space. A first instance of the second non-player game entity may generate a first version of the second type of non-player game entity generated content within the virtual space. The first version of the first type of non-player game entity and the first version of the second type of non-player game entity may be related by the first theme.

By way of non-limiting example, following the above Tree House Builder example, the non-player game entity may be configured to build different versions of a tree house within the virtual space for each instance of the corresponding non-player game entity. Although, the individual structures of the tree houses (or other generated content) may differ in different instances, the tree houses as a whole may be related by a common theme. For example, a branded theme may be a movie theme such as Disney's "FROZEN," an adventure theme may be "pirates," a holiday theme may be "Halloween," and a color theme may be "pink." Thematic relationships may be considered in other ways.

In some implementations, non-player game entity generated content may include one or more games. Games may include online games, multi-player games, mini games, bonus games, solo games, campaign games, skills games, games of changes, race games, obstacle course games and/or other games. In some implementations, a game may be associated with one or more game objectives and/or one or more game rules. In some implementations, games may be associated with one or more game objectives, game rules and/or other information. The non-player game entities may be configured to create games in the virtual space much like users may be able to create games in the virtual space within their user-generated content.

In some implementations, the creation of a game by a non-player game entity may be facilitated by controlling a non-player game entity to build a combination of one or more virtual objects, define one or more actions and/or effects for one or more virtual objects (e.g., casual object, causal behavior, effected object, effected behavior), define action criteria, and/or define other aspects of content. In some implementations, by placing one or more virtual objects within the virtual space, designating actions and/or effects for one or more of the virtual objects, and establishing logical relationships between the actions and effects through action criteria, one or more rules of the game may be satisfied, thereby making achieving an objective possible.

In some implementations, the instructions for controlling a non-player game entity may include defining action criteria for one or more virtual objects. The action criteria may define relationships for a causal object, a causal behavior, an effected object, an effected behavior and/or other aspects of the cause and effect relationship. The causal behavior may relate to an action performed on or by the causal object. The effected behavior may relate to an action performed on or by the effected object. The performance of the causal behavior on or by the causal object may effectuate a corresponding action (e.g., effected behavior) on or by the effected object. By establishing cause and effect relationships, rules for user interaction may be effectuated within the virtual space. Thus, completing objectives of a game created by a non-player game entity may be made possible.

By way of non-limiting example, a game created by a non-player game entity may include an obstacle course, and/or other type of game. An objective of the game may include completing the obstacle course within a predetermined time limit. A rule may include that the user must start at a starting line and cross over a finish line within the predetermined time limit. A first virtual object (first causal object) may be a starting line positioned within the virtual space at the start of the course. The starting line may be configured with one or more programming rules representing an action (first causal behavior) that may be performed on or by the starting line in the virtual space. The first causal behavior may include "being crossed over by a game entity." A second virtual object (first effected object) may be a stopwatch depicted in the virtual space. The stopwatch may be configured to perform an action (first effected behavior) of starting a count from zero (e.g., in seconds, milliseconds and/or other unit of time) and/or other actions. A relationship may specify that "if the first casual behavior is satisfied for the first causal object", then "effectuate the first effected behavior in the first effected object". That is to say, if the starting line is crossed over by the game entity, then the stop watch may start counting time.

Continuing with the above non-limiting example, a second virtual object (second causal object) may be a finish line positioned at the end of the course. The finish line may be configured with one or more programming rules representing an action (second causal behavior) that may be performed on or by the finish line in the virtual space. The second causal behavior may include "being crossed over by a game entity" and/or other actions. The stopwatch may be configured to perform a second action (second effected behavior) of stopping the counting of time, and/or other actions. A relationship may specify that "if the second casual behavior is satisfied for the second causal object", then "effectuate the second effected behavior in the first effected object". That is to say, if the finish line is crossed over by the game entity, then the stop watch may stop counting time.

It is noted that the above example is provided for illustrative purposes only and is not to be considered limiting. In other implementations, causal objects, causal behavior, effected object, effected behavior, action criteria, relationships between objects, and/or games may be considered in other ways. For example, virtual objects, relationships between virtual objects and/or action criteria may be used to satisfy other rules such as a boundary of a game area, rules associated with user interaction with virtual objects included in the game, rules associated with user interaction with other users in the game, establishing a time period in which a gameplay objective must be completed and/or other rules.

Figure 2:
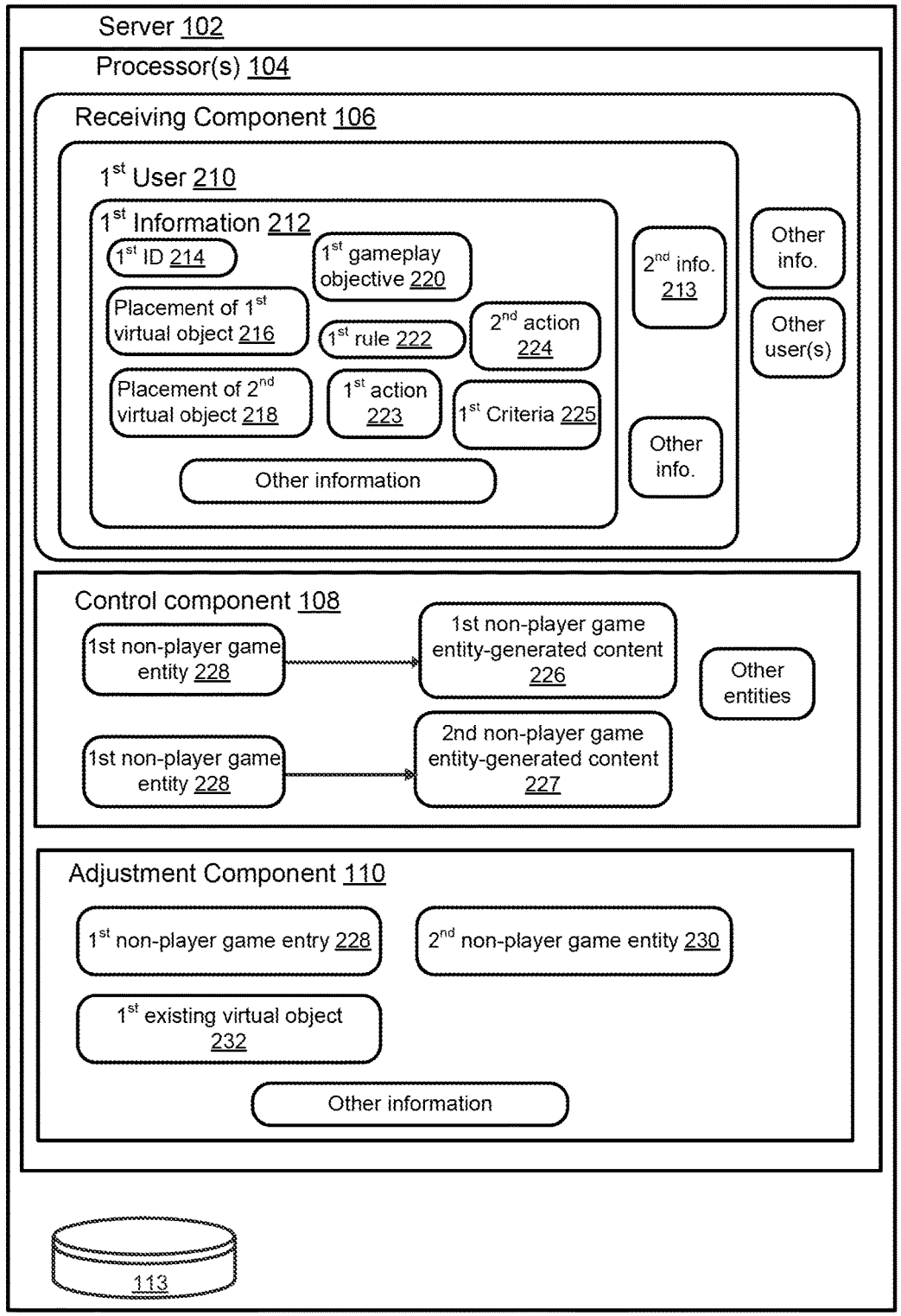
FIG. 2 illustrates an implementation of a server employed in the system of FIG. 1.

As an illustrative example in FIG. 2, the receiving component 106 may be configured to obtain first information 212. The first information 212 may be associated with a first non-player game entity 228. The first non-player game entity 228 may be associated with a first user 210. The first information 212 may include instructions for controlling the first non-player game entity 228 in the virtual space. The first information 212 may be obtained from a first computing platform (not shown) associated with the first user 210, electronic storage 113, and/or sources.

In some implementations, the first information 212 may include a first identification 214 of the first non-player game entity 228 and/or other information. The receiving component 106 may use the first identification 214 to lookup the instructions for controlling the first non-player game entity 228 in the virtual space. For example, the receiving component 106 may use the first identification 214 to look up information such as one or more of a first virtual object 216 associated with the first non-player game entity generated content 226, placement of the first virtual object 216, a second virtual object 218, placement of the second virtual object 218, a first gameplay objective 220 associated with a first game (not shown), a first gameplay rule 222, a first action 223 associated with the first virtual object 216, a second action 224 associated with the second virtual object 218, first criteria 225 specifying a causal relationship between the first action 223 and the second action 224, and/or other information.

The first criteria 225 may specify the first virtual object 216 as a casual object. The first criteria 225 may specify the first action 223 as a causal behavior of the first virtual object 216. The first criteria 225 may specify the second virtual object 218 as an effected object. The first criteria 225 may specify the second action 224 as an effected behavior of the second virtual object 218. In some implementations, the first criteria 225 may specify a causal relationship between the first action 223 of the first virtual object 216 and the second action 224 of the second virtual object 218. For example, the first criteria 225 may specify that "if the first action 223 is satisfied for the first virtual object 216, then effectuate the second action 224 of the second virtual object 218" and/or other specifications. The relationship established by the first criteria 225 may be associated with the first gameplay rule 222. The implementation of the first criteria 225 during and/or after placing the first virtual object 216 and the second virtual object 218 within the virtual space may thereby satisfy the first gameplay rule 222. As a result, the first gameplay objective 220 may be made possible.

In some implementations, the first information 212 may include one or more of the first identification 214, the first virtual object 216 associated with the first non-player game entity generated content 226, placement of the first virtual object 216, the second virtual object 218 associated with the first non-player game entity generated content 226, placement of the second virtual object 218, the first gameplay objective 220, the first gameplay rule 222 for interaction with the first non-player game entity generated content (e.g., a game), the first action 223 associated with the first virtual object 216, the second action 224 associated with the second virtual object 218, the first criteria 225 specifying a causal relationship between the first action 223 and the second action 224 and/or other information.

In some implementations, the receiving component 106 may be configured to obtain second information 213 and/or other information. The second information 213 may be associated with the first non-player game entity 228. The second information 213 may be associated with instructions for controlling the first non-player game entity 228 in the virtual space to configure corresponding second non-player game entity generated content 227 within the virtual space. In some implementations, the second non-player game entity generated content 227 and the first non-player game entity generated content 226 may be related by a common theme. In some implementations, the second non-player game entity generated content 227 and the first non-player game entity generated content 226 may not be related by a common theme.

Returning to FIG. 1, the control component 108 may be configured to control the non-player game entities based on the information obtained by the receiving component 106, and/or other information. The control component 108 may be configured to control the non-player game entities in the virtual space to maneuver in manner that represents the procedural placement of one or more virtual objects associated with the non-player game entity generated content.

In some implementations, the control component 108 may be configured to implement action criteria and/or "cause an effect" relationships between the virtual objects. In some implementations, programming rules associated with different causal and/or effected objects may be implemented during the procedural placement of the virtual objects, may be implemented once all virtual objects have been placed and/or by other techniques.

By way of non-limiting example, in creating an obstacle course as describe above, the starting line may be rendered in the virtual space (e.g., presented within views of the virtual space) and positioned at a location within the virtual space. The stop watch may be rendered within the virtual space and positioned at a location within the virtual space. The finish line may be rendered in the virtual space and placed at a location within the virtual space. Virtual objects representing obstacles may be rendered in the virtual space and placed at locations within the virtual space (e.g., between the starting line and finish line). Programming rules for the course may then be implemented. This may include defining the starting line and finish line as causal objects, defining the causal behaviors of the causal objects, defining the stop watch as an effected object, defining the effected behaviors of the effected object and/or other definitions.

In some implementations, the control component 108 may be configured to determine whether the one or more virtual objects (e.g., the elemental virtual objects and/or other virtual objects) associated with the non-player game entity generated content correspond to virtual objects included in the inventories of virtual objects associated with the users. In some implementations, the non-player game entities may be deployable within the virtual space after a positive determination is made that one or more virtual objects associated with the non-player game entity generated content correspond to virtual objects included in inventories of virtual objects associated with the users. In some implementations, the non-player game entities may not be deployable absent a positive determination.

By way of non-limiting example, a tree house may be associated with elemental virtual objects that comprise wooden blocks and/or other virtual objects. In order for a Tree House Builder type non-player game entity to be deployed to build a tree house in an instance of a virtual space, the user may have to have included in their inventory at least one wooden block type elemental virtual objects. In some implementations, the user may have to have included in their inventory the appropriate quantity of element virtual objects in order for the non-player game entity generated content to be implemented in the virtual space.

Absent a positive determination that the user has included in the virtual inventory the appropriate virtual object(s) and/or quantities of the virtual objects, the non-player game entity may not be deployable in the virtual space. For example, the user may receive an alert when attempting to deploy a non-player game entity such as, "You do not have the appropriate building materials to complete this build, please try again after all materials have been acquired", and/or other information.

As an illustrative example in FIG. 2, the control component 108 may be configured to control the first non-player game entity 228 in the virtual space. The control of the first non-player game entity 228 may configure the first non-player game entity generated content 226 in the virtual space. In some implementations, the control component 108 may be configured to control other non-player game entities in the virtual space.

In some implementations, the control component 108 may be configured to control the first non-player game entity 228 based on the first information 212 and/or other information. In some implementations, the control component 108 may be configured to effectuate the placement of the first virtual object 216 by the first non-player game entity 228, placement of the second virtual object 218 by the first non-player game entity 228, and/or other operations. The control component 108 may be configured to implement the first criteria 225. In some implementations, the first criteria 225 may include effectuating one or more programming rules that specify a causal relationship between the first action 223 as a causal behavior of the first virtual object 216 and the second action 224 as an effected behavior of the second virtual object 218. The first criteria 225 may specify that, "if the first action 223 is satisfied for the first virtual object 216, then effectuate the second action 224 of the second virtual object 218", and/or other specifications.

Returning to FIG. 1, the adjustment component 110 may be configured to dynamically adjust and/or modify the control of the non-player game entities in the virtual space (e.g., by the control component 108). The control of the non-player game entities may be adjusted and/or modified based on one or more of user interactions in the virtual space, other non-player game entity(s) present in the virtual space (e.g., also building content in the virtual space), existing virtual objects in the virtual space, and/or other factors.

In some implementations, during control of a non-player game entity and subsequent implementation of the corresponding non-player game entity-generated content, the "building" of the content may take into account other non-player game entity(s) present in the virtual space. By way of non-limiting example, users may deploy multiple non-player game entities in the virtual space. The adjustment component 110 may be configured to determine the presence of one or more non-player game entities within the virtual space by virtue of such deployment by the user.

A given non-player game entity may interact with other non-player game entities and/or other content in the virtual space. In some implementations, the non-player game entities may interact in such a way that allows one or more non-player game entities to successfully build their corresponding non-player game entity-generated content without negatively effecting the non-player game entity-generated content of others and/or themselves. For example, if two non-player game entities are deployed within a relatively close proximity within the virtual space, the adjustment component 110 may be configured to modify the instructions for procedural placement of elemental virtual objects based on the determined presence of existing non-player game entity(s) such that the different non-player game entity-generated content may not overlap and/or interfere with each other. This may include, for example, adjusting the placement of virtual objects by one or both of the non-player game entities such that different virtual objects are not placed within the same place and/or location. In other words, if instructions for controlling a first non-player game entity includes instructions for placing a first virtual object in a first location, and second instructions for controlling a second non-player game entity includes instructions for placing a second virtual object in the first location, one or both of the first instruction or second instruction may be modified such that one or both of the first virtual object or second virtual object are not placed at the first location.

In some implementations, the "building" of the non-player game entity-generated content within the may take into account existing virtual objects present in the virtual space. The adjustment component 110 may be configured to determine the presence of one or more existing virtual objects within the virtual space. Existing virtual objects may correspond to existing user-generated content, existing non-player game entity-generated content, and/or other existing virtual objects present within the virtual space. The non-player game entities my interact with existing virtual objects in the virtual space in a way that allows the non-player game entities to successfully build their corresponding non-player game entity-generated content without negatively effecting the existing virtual objects and/or the corresponding non-player game entity-generated content. For example, if one or more elemental virtual objects associated with first non-player game entity are to be procedurally placed within a relatively close proximity to existing virtual objects, the adjustment component 110 may be configured to modify the instructions for procedural placement of elemental virtual objects based on the determined presence of existing virtual objects. The modification may include changing the instructions such that the placement of the elemental virtual objects does not overlap and/or interfere with the existing virtual objects. This may include, for example, placing the elemental virtual objects around the existing virtual objects.

In some implementations, the "building" of the non-player game entity-generated content within the may take into account user interaction in the virtual space, and/or other factors. The non-player game entity-generated content may be modifiable the users in the virtual space. The adjustment component 110 may be configured to determine the occurrence of user interactions with the non-player game entity and/or non-player game entity-generated content. User interactions with the building of the non-player game entity-generated content may correspond to users providing input and selections in real time or near real time during the building of the non-player game entity-generated content, and/or other input.

User input and/or selections may include selections to modify the non-player game entity-generated content as it is being built, input and/or selections to modify the non-player game entity-generated content after it has been built, and/or other input. The adjustment component 110 may be configured to modify the instructions for procedural placement of element virtual objects by the non-player game entity based on user interactions with the content and/or the non-player game entity. This may include a user providing input and/or selection to move a position of a first virtual object from a first location to a second location, and/or other input.

As an illustrative example in FIG. 2, the adjustment component 110 may be configured to determine the presence of one or more other non-player game entities within the first instance of the virtual space. This may include determining a presence of a second non-player game entity 230, and/or other content. As a result, the adjustment component 110 may be configured to adjust the control of the first non-player game entity 228 based on the determined presence of the second non-player game entity 230. For example, the control of the non-player game entities may be adjusted so virtual objects may not be placed in the same location, and/or other may be adjusted in other ways. In some implementations, the adjustment may include modifying the control of the non-player game entities such that non-player game entities "build around" each other's corresponding non-player game entity-generated content.

In some implementations, the adjustment component 110 may be configured to determine presence of one or more existing virtual objects within the first instance of the virtual space. The existing virtual objects may include a first existing virtual object 232 present in the first instance of the virtual space, and/or other content. As a result, the adjustment component 110 may be configured such that the control of the first non-player game entity 228 may be adjusted and/or modified based on the determined presence of the first existing virtual object 232, and/or other content. In some implementations, adjusting the control of the first non-player game entity 228 may include changing the placement of the one or more virtual objects in the virtual space, and/or other adjustments.

Returning to FIG. 1, server 102, computing platforms 118 and/or external resources 116 may be operatively linked via one or more electronic communication links. For example, such electronic communication links may be established, at least in part, via a network (e.g., network(s) 114) such as the Internet and/or other networks. It will be appreciated that this is not intended to be limiting, and that the scope of this disclosure includes implementations in which server 102, computing platforms, and/or external resources 116 may be operatively linked via some other communication media.

The external resources 116 may include sources of information that are outside of system 100, external entities participating with system 100, and/or other resources. In some implementations, some or all of the functionality attributed herein to external resources 116 may be provided by resources included in system 100.

Computing platforms 118 may include electronic storage 126, one or more processors 120, and/or other components. Computing platforms 118 may include communication lines, or ports to enable the exchange of information with a network, a server, and/or other computing platforms. Illustration of computing platforms 118 in FIG. 1 is not intended to be limiting. Computing platforms 118 may include a plurality of hardware, software, and/or firmware components operating together to provide the functionality attributed herein to computing platforms 118.

Server 102 may include electronic storage 113, one or more processors 104, and/or other components. Server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage (e.g., 113 and/or 126) may comprise electronic storage media that electronically stores information. The electronic storage media of the electronic storage may include one or both of storage that is provided integrally (i.e., substantially non-removable) with the respective device and/or removable storage that is removably connectable to the respective device. Removable storage may include for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store files, software algorithms, information determined by processor(s) and/or other information that enables the respective devices to function as described herein.

Processor(s) (e.g., 104 and/or 120) are configured to provide information processing capabilities in the respective devices. As such, processors may include one or more of a physical processor, a digital processor, an analog processor, a digital circuit designed to process information, an analog circuit designed to process information, a state machine, and/or other mechanisms for electronically processing information. Although the processors are shown in FIG. 1 as single respective entities within the respective devices, this is for illustrative purposes only. In some implementations, the processors may include one or more processing units. These processing units may be physically located within the same device, or may represent processing functionality of a plurality of devices operating in coordination.

For example, processor 104 may be configured to execute components 106, 108, and/or 110. Processor 104 may be configured to execute components 106, 108, and/or 110 by software; hardware; firmware; some combination of software, hardware, and/or firmware; and/or other mechanisms for configuring processing capabilities on processor 104.

It should be appreciated that although components 106, 108, and/or 110 are illustrated in FIG. 1 as being co-located within a single processing unit, in implementations in which processor 104 includes multiple processing units, one or more of components 106, 108, and/or 110 may be located remotely from the other components. The description of the functionality provided by the different components 106, 108, and/or 110 described above is for illustrative purposes, and is not intended to be limiting, as any of components 106, 108, and/or 110 may provide more or less functionality than is described. For example, one or more of components 106, 108, and/or 110 may be eliminated, and some or all of its functionality may be provided by other ones of components 106, 108, 110, and/or other components. As another example, processor 104 may be configured to execute one or more additional components that may perform some or all of the functionality attributed to one or more of components 106, 108, and/or 110.

For example, processor 120 may be configured to execute components 122, 123, 124, and/or 125. Processor 120 may be configured to execute components 122, 123, 124, and/or 125 by software; hardware; firmware; some combination of software, hardware, and/or firmware; and/or other mechanisms for configuring processing capabilities on processor 120.

It should be appreciated that although components 122, 123, 124, and/or 125 are illustrated in FIG. 1 as being co-located within a single processing unit, in implementations in which processor 120 includes multiple processing units, one or more of components 122, 123, 124, and/or 125 may be located remotely from the other components. The description of the functionality provided by the different components 122, 123, 124, and/or 125 described above is for illustrative purposes, and is not intended to be limiting, as any of components 122, 123, 124, and/or 125 may provide more or less functionality than is described. For example, one or more of components 122, 123, 124, and/or 125 may be eliminated, and some or all of its functionality may be provided by other ones of components 122, 123, 124, 125, and/or other components. As another example, processor 120 may be configured to execute one or more additional components that may perform some or all of the functionality attributed to one or more of components 122, 123, 124, and/or 125.

Figure 3:
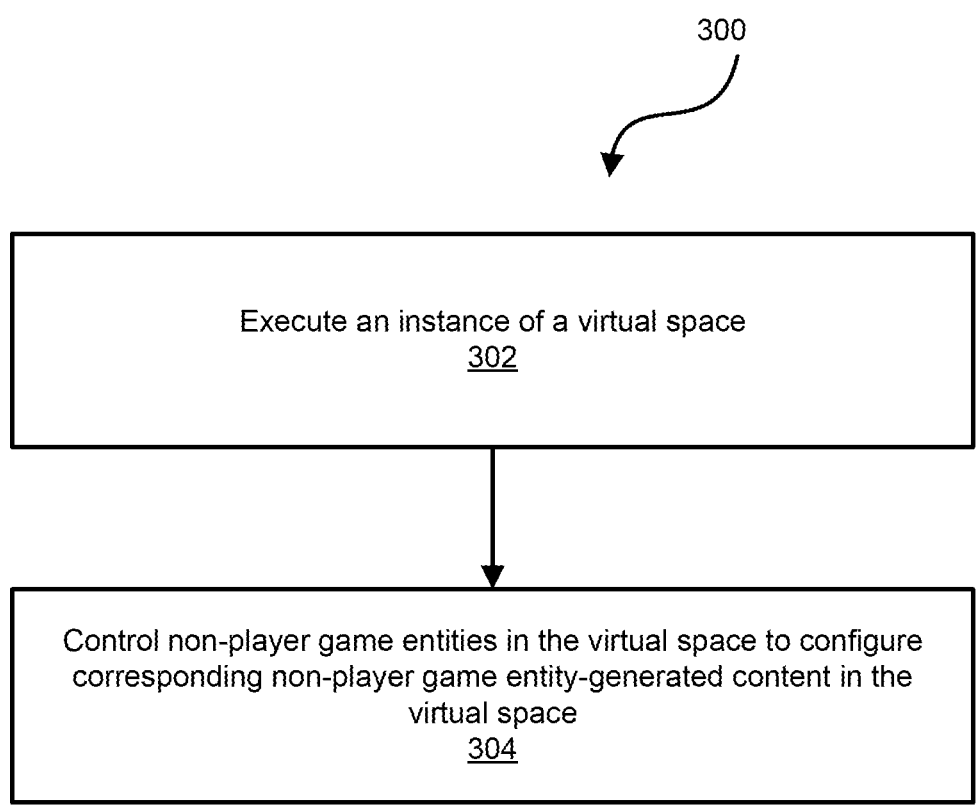
FIG. 3 illustrates an implementation of a method of providing content in a virtual space.

FIG. 3 illustrates a method 300 of providing content in a virtual space. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below are not intended to be limiting.

In some implementations, method 300 may be implemented in a computer system comprising one or more of one or more processing devices (e.g., a computing platform, a physical processor, a digital processor, an analog processor, a digital circuit designed to process information, an analog circuit designed to process information, a state machine, and/or other mechanisms for electronically processing information), storage media storing machine-readable instructions, and/or one or more other components. The one or more processing devices may include one or more devices executing some or all of the operations of method 300 in response to instructions stored electronically on an electronic storage media. The one or more processing devices may include one or more devices configured through hardware, firmware, and/or software to be specifically designed for execution of one or more of the operations of method 300.

Referring now to method 300 in FIG. 3, at an operation 302, an instance of a virtual space may be executed. The instance of the virtual space may be implemented to facilitate user participation in the virtual space. User participation in the virtual space may include entry and/or selection of virtual space content by the users via computing platforms. In some implementations, operation 302 may be performed by one or more physical processor executing a space component the same as or similar to space component 122 (shown in FIG. 1 and described herein).

At an operation 304, non-player game entities may be controlled in the virtual space to generate virtual space content. The corresponding non-player game entity-generated content may include interactive content that may facilitate gameplay within the virtual space and/or other content. In some implementations, operation 304 may be performed one or more physical processor executing by a control component same or similar to control component 108 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing content in a virtual space, the system comprising:

one or more physical processors configured by machine-readable instructions to:

execute an instance of a virtual space, and implement the instance of the virtual space to facilitate user participation in the virtual space, wherein user participation in the virtual space includes entry and/or selection of virtual space content by users via computing platforms, the entry and/or selection of the virtual space content corresponding to requests to define interactive user-generated content, such that a first instance of the virtual space is executed to facilitate participation by a first user in the virtual space, wherein participation by the first user in the virtual space includes entry and/or selection of virtual space content via a first computing platform, the entry and/or selection of virtual space content via the first computing platform corresponding to requests to define first user-generated content, the first user-generated content corresponding to one or more of a first virtual object, a second virtual object, a first causal behavior, a first effected behavior, or first criteria specifying a causal relationship between the first causal behavior and the first effected behavior; and control non-player game entities in the virtual space to generate non-player game entity-generated content, the non-player game entity-generated content including interactive content to facilitate gameplay within the virtual space, the control of the non-player game entities including control of a first non-player game entity to generate first non-player game entity-generated content in the first instance of the virtual space, wherein the first non-player game entity-generated content corresponds to one or more of a third virtual object, a fourth virtual object, a second causal behavior, a second effected behavior, or second criteria specifying a causal relationship between the second causal behavior and the second effected behavior;

wherein the one or more physical processors are further configured by the machine-readable instructions such that controlling the first non-player game entity to generate the first non-player game entity-generated content includes:

effectuating procedural placement of the third virtual object at a first location within the virtual space and the fourth virtual object at a second location within the virtual space, associating the second causal behavior with the third virtual object and the second effected behavior with the fourth virtual object, and establishing the second criteria by specifying that detected occurrences of the second causal behavior by the third virtual object cause performance of the second effected behavior by the fourth virtual object.

2. The system of claim 1, wherein the one or more physical processors are further configured by the machine-readable instructions such that the first non-player game entity-generated content corresponds to a first interactive game.

3. The system of claim 1, wherein the one or more physical processors are further configured by the machine-readable instructions to determine presence of one or more existing virtual objects within the first instance of the virtual space, such that the control of the first non-player game entity is changed based on the determined presence of the one or more existing virtual objects.

4. The system of claim 1, wherein the one or more physical processors are further configured by the machine-readable instructions to determine presence of one or more other non-player game entities within the first instance of the virtual space, such that the control of the first non-player game entity is changed based on the determined presence of the one or more other non-player game entities.

5. The system of claim 1, wherein the one or more physical processors are further configured by the machine-readable instructions to determine whether the third virtual object and the fourth virtual object correspond to virtual objects included in a first inventory of one or more virtual objects associated with the first user.

6. The system of claim 1, wherein the one or more physical processors are further configured by the machine-readable instructions such that the first non-player game entity-generated content is modifiable by the first user within the first instance of the virtual space.

7. The system of claim 1, wherein the one or more physical processors are further configured by the machine-readable instructions to control the first non-player game entity to generate second non-player game entity-generated content in the first instance of the virtual space.

8. The system of claim 7, wherein the one or more physical processors are further configured by the machine-readable instructions such that the second non-player game entity-generated content and the first non-player game entity-generated content are related by a common theme.

9. A method of providing content in a virtual space, the method being implemented in a computer system including one or more physical processors and storage media storing machine-readable instructions, the method comprising:

executing an instance of a virtual space, and implementing the instance of the virtual space to facilitate user participation in the virtual space, wherein user participation in the virtual space includes entry and/or selection of virtual space content by users via computing platforms, the entry and/or selection of the virtual space content corresponding to requests to define interactive user-generated content, such that a first instance of the virtual space is executed to facilitate participation of a first user in the virtual space, wherein participation by the first user in the virtual space includes entry and/or selection of virtual space content via a first computing platform, the entry and/or selection of virtual space content via the first computing platform corresponding to requests to define first user-generated content, the first user-generated content corresponding to one or more of a first virtual object, a second virtual object, a first causal behavior, a first effected behavior, or first criteria specifying a causal relationship between the first causal behavior and the first effected behavior; and controlling non-player game entities in the virtual space to generate non-player game entity-generated content, the non-player game entity-generated content including interactive content to facilitate gameplay within the virtual space, the control of the non-player game entities including control of a first non-player game entity to generate first non-player game entity-generated content in the first instance of the virtual space, wherein the first non-player game entity-generated content corresponds to one or more of a third virtual object, a fourth virtual object, a second causal behavior, a second effected behavior, or second criteria specifying a causal relationship between the second causal behavior and the second effected behavior;

wherein controlling the first non-player game entity to generate the first non-player game entity-generated content includes:

effectuating procedural placement of the third virtual object at a first location within the virtual space and the fourth virtual object at a second location within the virtual space, associating the second causal behavior with the third virtual object and the second effected behavior with the fourth virtual object, and establishing the second criteria by specifying that detected occurrences of the second causal behavior by the third virtual object cause performance of the second effected behavior by the fourth virtual object.

10. The method of claim 9, wherein the first non-player game entity-generated content corresponds to a first interactive game.

11. The method of claim 9, further comprising:
determining presence of one or more existing virtual objects within the first instance of the virtual space, such that the control of the first non-player game entity is changed based on the determined presence of the one or more existing virtual objects.

12. The method of claim 9, further comprising:
determining presence of one or more other non-player game entities within the first instance of the virtual space, such that the control of the first non-player game entity is changed based on the determined presence of the one or more other non-player game entities.

13. The method of claim 9, further comprising:
determining whether the third virtual object and the fourth virtual object correspond to virtual objects included in a first inventory of one or more virtual objects associated with the first user.

14. The method of claim 9, wherein the first non-player game entity-generated content is modifiable by the first user within the first instance of the virtual space.

15. The method of claim 9, further comprising controlling the first non-player game entity to generate second non-player game entity-generated content in the first instance of the virtual space.

16. The method of claim 15, wherein the second non-player game entity-generated content and the first non-player game entity-generated content are related by a common theme.

* * * * *